US007747213B2

(12) United States Patent
Van Lieshout et al.

(10) Patent No.: US 7,747,213 B2
(45) Date of Patent: Jun. 29, 2010

(54) METHOD OF REDUCING CONFIGURATION INFORMATION IN THE SIGNALING OF RADIO BEARER INFORMATION FOR A PLURALITY OF MULTICAST/BROADCAST SERVICES

(75) Inventors: Gert Jan Van Lieshout, Middlesex (GB); Himke Van Dervelde, Middlesex (GB); Soeng-Hun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 956 days.

(21) Appl. No.: 11/232,243

(22) Filed: Sep. 22, 2005

(65) Prior Publication Data

US 2006/0068793 A1    Mar. 30, 2006

(30) Foreign Application Priority Data

Sep. 22, 2004    (GB)    .................................. 0421804.5

(51) Int. Cl.
H04W 4/20    (2009.01)

(52) U.S. Cl. .................... 455/3.01; 455/432.3; 455/525; 455/466

(58) Field of Classification Search ........................ None
See application file for complete search history.

(56) References Cited

U.S. PATENT DOCUMENTS

2003/0100325 A1 *    5/2003    Paila et al. .............. 455/436 X
2004/0146041 A1    7/2004    Lee et al.
2004/0152453 A1    8/2004    Hayashi
2005/0177620 A1    8/2005    Lee et al.

FOREIGN PATENT DOCUMENTS

| EP | 1 392 074 | 2/2004 |
|---|---|---|
| JP | 2004-135293 | 4/2004 |
| JP | 2004 221758 | 8/2004 |

(Continued)

OTHER PUBLICATIONS

Universal Mobile Telecommunications System (UMTS); Introduction of Multimedia Broadcast/Multicast Service (MBMS) in the Radio Access Network (RAN); Stage 2 (3GPP TS 25.346 v. 6.1.0 Release 6), XP-014016838, ETSI France-(Jun. 2004), 52 pages + cover.

(Continued)

*Primary Examiner*—Philip J Sobutka
(74) *Attorney, Agent, or Firm*—Roylance, Abrams, Berdo & Goodman, L.L.P.

(57) ABSTRACT

In a cellular communication network comprising a plurality of cells, and further comprising one or more multicast/broadcast service providers arranged to provide a plurality of multicast/broadcast services over a radio interface to a mobile communication device located in a current cell, a method is provided for providing radio bearer configuration information to enable the mobile communication device to receive a multicast/broadcast service. The method comprises the steps of providing to a mobile communication device messages containing information associated with the radio bearer configuration, wherein each message is associated with a plurality of multicast/broadcast services that are available to be transmitted to the mobile communication device when in the current cell, and, periodically transmitting the messages to the mobile communication device within the current cell.

17 Claims, 3 Drawing Sheets

FOREIGN PATENT DOCUMENTS

WO 02/054818 7/2002

OTHER PUBLICATIONS

3GPP TS 25.346, $3^{rd}$ Generation Partnership Project; Technical Specification Group Radio Access Network; Introduction of the Multimedia Broadcast Multicast Service (MBMS) in the Radio Access Network (RAN); Stage 2, Jun. 2004, Release 6, pp. 2-7E, 3 GPP, Valbonne, France.

"3GPP TSG-RAN2 Meeting #43", Aug. 16-20, 2004, pp. 2-7E, Prague, Czech Republic.

"3GPP TSG-RAN2 Meeting #44", Oct. 4-8, 2004, pp. 2-7E, Sophia Antipolis, France.

* cited by examiner

METHOD OF REDUCING CONFIGURATION INFORMATION IN THE SIGNALING OF RADIO BEARER INFORMATION FOR A PLURALITY OF MULTICAST/BROADCAST SERVICES

PRIORITY

This application claims the benefit under 35 U.S.C. 119(a) of an application entitled "Signaling of Radio Bearer Information" filed in the UK Patent Office on Sep. 22, 2004 and assigned Serial No. 0421084.5, the entire contents of which are hereby incorporated by reference.

BACKGROUND OF THE INVENTION

1. Field of the Invention

The present invention relates to the transmission of multimedia broadcast multicast services (MBMS) radio bearer (RB) configuration information. In particular, the present invention relates to the transmission of such information to enable user equipment (UE) to receive a point-to-multipoint (PTM) multimedia session.

2. Description of the Related Art

The term "MBMS" represents a service that provides users of a cellular telecommunications system with information, such as the streaming of video and audio files, news updates, or the like. The service may be one single ongoing session, or comprises a number of successive individual sessions during which part of the data is transferred. The MBMS may be utilized in broadcast mode wherein information is broadcast to all users within a cell. Alternatively, a multicast mode may be used wherein a subgroup of users within the cell are sent information they alone have requested, for example, football results. The multicast mode is useful for services that require a subscription.

It is planned to use MBMS with Universal Mobile Telecommunications System (UMTS) networks. Several 3rd Generation Partnership Project (3GPP) technical specifications are available for providing information on the relevant specifications. The technical specifications can be found at http://www.3gpp.org/specs/specs.htm, the entire content of which is hereby incorporated by reference. Some examples relevant to this patent application are 3GPP TS 22.146, 3GPP TS 25.301, 3GPP TS 25.346, 3GPP TS 25.401 and 3GPP TS 25.246, the entire contents of all of which are incorporated by reference.

Figure 1:
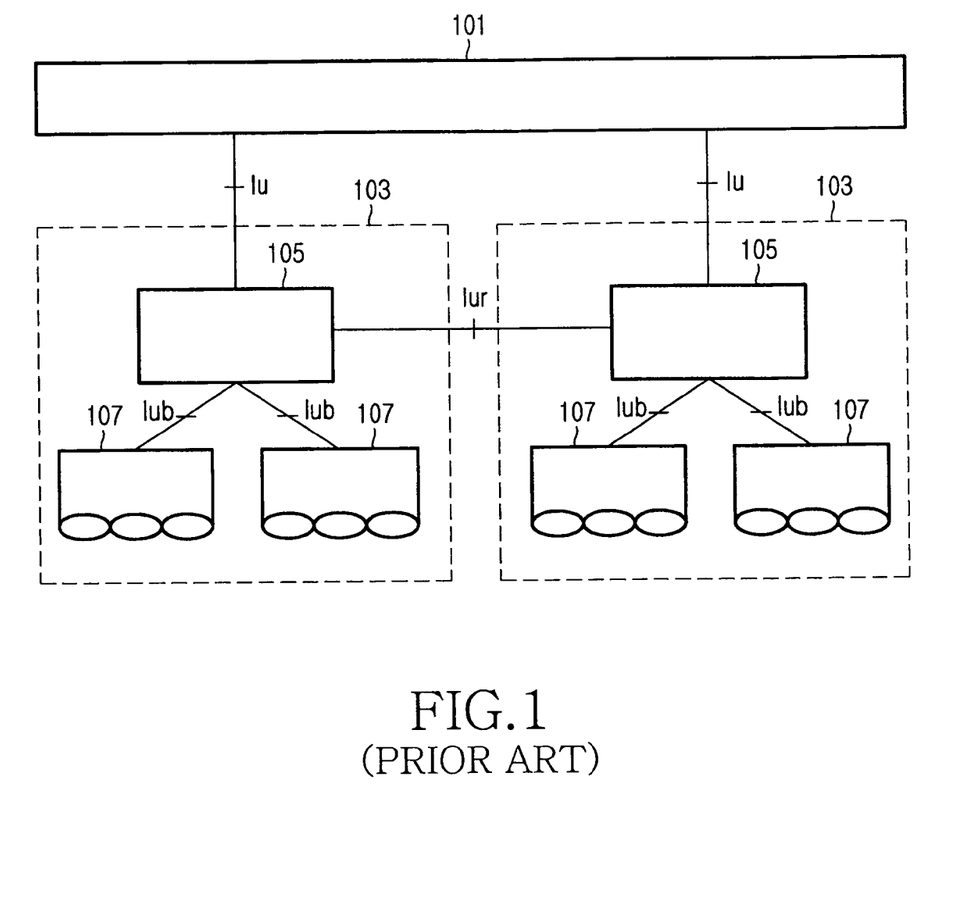
FIG. 1 is a diagram illustrating a network architecture for a conventional Universal Mobile Telecommunications System (UMTS) system.

A conventional UMTS radio network architecture is shown in FIG. 1. A core network 101 is connected to one or more radio network subsystems 103 via the Iu interface. Within each radio network subsystem 103, a radio network controller 105 connects to one or more base stations via the Iub interface. In the case of Universal Terrestrial Radio Access Network (UTRAN), Node B 107 is the base station. Each radio network controller 105 may be interconnected to other radio network controllers 105 by using the Iur interface.

Each Node B 107 can control one or more cells. Within each cell, there are numerous UEs some of which are able to receive MBMS services provided by a Broadcast Multicast Service Centre (BM-SC) located in the core network 101. The MBMS services are either broadcast to all UEs within the cell or multicast to only a selected group of UEs that have subscribed to the particular service. The UEs are mobile communication devices, for example, mobile telephones and PDAs. The UE connects to the Node B 107 via a radio interface (Uu).

The type of transfer mode to be used for a data transfer session of a specific MBMS service, i.e. point-to-point (p-t-p) or point-to-multipoint (PTM), is chosen depending upon the number of UEs within the cell that are interested in receiving the particular service and/or session. The UTRAN decides which transfer mode is used. For example, if a limited number of UEs are within the cell (for example, less than four) the UTRAN makes a decision to transfer the information supplied by the MBMS over the radio interface using the p-t-p mode in order to consume a minimum amount of radio capacity. Alternatively, if more UEs are within the cell, the PTM transfer mode is used to utilise the available radio capacity more economically.

When the UTRAN makes the decision to transmit information supplied by the MBMS in PTM mode, radio bearer configuration information is provided within the MBMS control information. MBMS control information is transmitted on the MBMS control channel, known as the multicast control channel (MCCH) over the radio interface (Uu) to the UE. The radio bearer configuration information provided on MCCH in the current cell allows a UE to receive services provided in PTM mode that are available in the current cell and potentially available from neighbouring cells. For these services, the information provided comprises the radio bearer configuration required for the UE to receive the MBMS data from the radio bearer in the current cell, as well as from the radio bearer in some neighbouring cells that are able to provide the same MBMS data PTM over a Multicast-Traffic-Channel (MTCH). The UE can combine the MBMS data received from the neighbouring cell radio bearer with the MBMS data received from the current cell radio bearer in order to improve the reception quality. Reception quality is improved by reducing the power required in each cell to provide sufficient coverage. The signalling of the radio bearer configuration information is discussed in more detail below. That is, the UE can receive a time aligned MTCH transmission from a neighbouring cell without receiving the MCCH of that cell.

Figure 2:
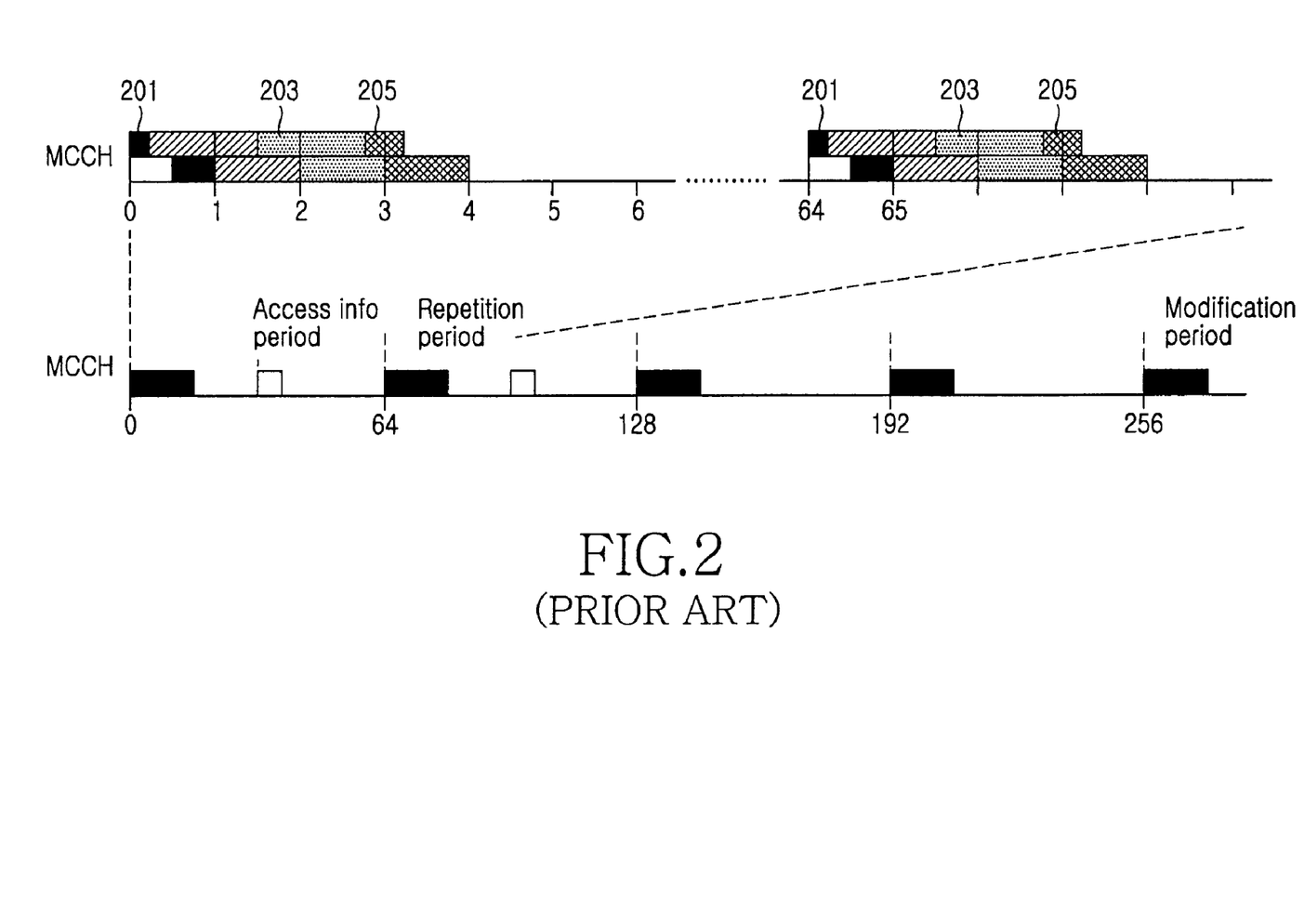
FIG. 2 is a diagram illustrating a conventional system of scheduling conventional messages.

The RB configuration information associated with each service signalled on the MCCH is repeated a number of times with exactly the same content. This MCCH information is transmitted at the beginning of every repetition period within a set modification period. Referring to FIG. 2, which shows scheduling of messages on the MCCH according to conventional systems, any messages that contain service specific MBMS RB information 201 that has changed since the last modification period are placed at the start of the repetition period, while any other messages containing unchanged service specific MBMS RB information 203 or unchanged Common RB information 205 are placed at a later time slot in the repetition period. That is, an MBMS notification is first transmitted giving information on each changed service. Subsequently information is transmitted in the form of one or more MBMS service PTM RB information messages or common RB information messages, comprising any changed RB configuration information associated with the MBMS services. The UTRAN then provides scheduling information indicating the final Transmission Time Interval (TTI) containing the changed information so that UEs that have previously received the RB configuration information are not required to read any further RB configuration information after the indicated TTI.

Each service provided by the MBMS typically corresponds with one radio bearer. The radio bearers are mapped onto a transport channel, Forward Access Channel (FACH) in the case of MBMS. One or more radio bearers are mapped to a single common FACH. The FACH provides the means to transfer data with a certain quality of service (QoS), for example, a certain data rate, residual error rate and delay. Therefore, any services that require the same quality of service are typically mapped to the same transport channel (FACH), whereas services that require lower or higher quality of services are mapped to other transport channels (FACH).

One or more transport channels (FACH) are mapped to a physical channel. In the case of MBMS, the secondary-common control physical channel (S-CCPCH). Each physical channel has certain characteristics, for example, type of power control, cell coverage, use of certain techniques, such as transmit diversity.

In the conventional UMTS, signalling of the MBMS radio bearer configuration information is performed by using two messages.

First, a "common RB info" message is used to hold and transmit RB configuration information that is either common between two or more services, or common between two or more cells.

This "common RB info" message may comprise either changed or unchanged information depending on whether or not the configurations of the radio bearers have changed since the previous modification period.

Second, for every service that is being provided using the PTM mode, a separate "service RB info" message is transmitted in order to specify how the radio bearer corresponding to the service is configured in the cell the UE is currently in, and also how the radio bearer is configured in any neighbouring cells that also provide the service over the MTCH of the neighbouring cell. This information provides the necessary configuration details for a UE to be able to receive one particular service.

Configuration information in the "common RB info" message can be used for any common configurations (either between cells or services). In other words, if there is configuration information common between services or cells, it would be transmitted in the "common RB info" message. The common configuration information is then not required in the "service RB info" message. The "service RB info" message is merely required to comprise a reference to the applicable common configurations within the "common RB info" message.

For each service available within a cell, information on the entire radio configuration is provided. This radio configuration information comprises the radio bearer configurations of the actual radio bearers ("real" RB configurations), the transport channel (TrCh) configurations (FACH for MBMS) and physical channel (PhyCh) configurations (S-CCPCH for MBMS). Therefore, if either the "real" RB configurations or transport channel configurations are common between a number of services available in that cell, references to these common configurations are duplicated, thus causing increases in the signalling overhead on the MCCH. For example, if one MBMS service is provided by a first radio bearer, and a second MBMS service is provided by a second radio bearer, where the services require the same quality of service (QoS), the two services will be mapped to the same transport channel (FACH). As there will be a separate "service RB info" message for each service, references to the RB common configurations for the FACH within each of the "service RB info" messages will be duplicated.

The duplication will be illustrated in greater detail. Assuming 5 services are provided in the current cell using the PTM transfer mode and assuming that for each service the PTM radio bearer configuration is provided for 6 neighbouring cells also, with the current state of the art, for each service a message is provided as shown in table 1.

TABLE 1

"Service RB Info" message - for service A

| Cell | actual RB-common config | TrCh common config | PhyCh common config |
|---|---|---|---|
| Current | 1 | 1 | 1 |
| N-1 | 1 | 1 | 1 |
| N-2 | 1 | 1 | 1 |
| N-3 | 1 | 2 | 1 |
| N-4 | 1 | 2 | 1 |
| N-5 | 2 | 3 | 1 |
| N-6 | 1 | 1 | 2 |

Table 1 depicts information that is transmitted in the 'Service RB info' message for one particular MBMS service. Inside this message are references to RB, TrCh and PhyCh common configuration information that is transmitted within the 'Common RB info' message. The 'Service RB info' message comprises the configuration information for the current cell and all neighbouring cells (six in this example) for one particular MBMS service.

The first column indicates which cell the data is referring to, either the current cell, or one of the six neighbouring cells (N-1 through N-6). The numbers in the next three columns indicate the types of RB, TrCh and PhyCh configuration used in the relevant cell. Each of these numbers refers to a specific type of configuration as included in the "common RB info" message. The service A shown in the example covered by table 1, applies actual RB configuration type 1, TrCh configuration type 1 and PhyCh configuration type 1 in the current cell. The table also shows that, for this example, the common RB configuration comprises at least 2 actual RB configurations, 3 TrCh configurations and 2 PhyCh configurations.

The case where all MBMS services in a cell are mapped to the same physical channel can be regarded as typical. The current state of the art, which involves a separate message per service, therefore has a reference to indicate the PhyCh configuration used in the concerned cell for each service. In the example case where five services are provided, there will be a reference to PhyCh configuration 1 indicated five times, i.e. one for each service. This produces a large amount of signalling, which merely provides the same information to the UE a number of times. Further, where it is chosen to comprise actual configuration information rather than references, the duplication of this configuration information substantially increases the signalling overhead.

When specifying the RB configuration per service, the UE is not required to read RB configuration information concerning services that it is not interested in i.e. non-active services. This helps to reduce the time the UE needs to read the MCCH and so reduces the UE power consumption. However, this comes at the cost of duplication (whether the information is comprised of actual configuration information or references to actual configuration information) of MBMS control information on MCCH as shown in the above example.

Thus, two conflicting requirements appear within the configuration of the conventional system. That is, in order for UE power consumption to be kept to a minimum, information needs to be duplicated in order to reduce the time required for the UE to acquire the MBMS control information on the MCCH. However, the duplication of information increases the signalling overhead. That is, the amount of MBMS control information is not kept within reasonable limits when compared with the MBMS data traffic.

SUMMARY OF THE INVENTION

The present invention is to solve the above and other problems, and an object of the present invention is to provide a method of providing radio bearer configuration for receiving a multicast/broadcast service.

An aspect of the present invention is to provide, in a cellular communication network comprising a plurality of cells and one or more multicast/broadcast service providers arranged to provide a plurality of multicast/broadcast services over a radio interface to a mobile communication device located in a current cell, a method of providing radio bearer configuration information to enable the mobile communication device to receive a multicast/broadcast service. The method comprises the steps of providing to a mobile communication device messages containing information associated with the radio bearer configuration, wherein each message is associated with a plurality of multicast/broadcast services that are available to be transmitted to the mobile communication device when in the current cell, and, periodically transmitting the messages to the mobile communication device within the current cell.

Another aspect of the present invention is to provide, in a terrestrial mobile cellular network comprising a core network and a radio access network, a method of sending a radio bearer configuration information message on a multicast control channel over the radio interface, said radio bearer configuration information message being used to specify the radio bearer configuration in order to allow at least one multimedia broadcast multicast service to be received by the mobile communication device. The core network comprises a broadcast multicast service centre and the radio access network comprises a radio network controller connected to at least one base station. The base station is arranged to be connected via a radio interface to one or more mobile communication devices located in one cell and said network is further arranged to provide multimedia broadcast multicast services from the broadcast multicast service centre to one of said mobile communication devices. The method comprises the steps of periodically transmitting within each cell a respective radio bearer configuration information message, the radio bearer configuration message for each cell comprising radio bearer configuration information associated with a plurality of multimedia broadcast multicast services available for reception by the mobile communication device within that cell.

Yet another aspect of the present invention is to provide, in a cellular communication network comprising a plurality of cells and one or more service providers arranged to provide services over a radio interface to a current cell, a method of receiving information to enable a mobile communication device to receive at least one service. The method comprises the steps of receiving messages associated with the radio bearer configuration of radio bearers adapted to transmit at least one of the services to the mobile communication device in the current cell, wherein each message is associated with a plurality of services that are available to be received by the mobile communication device from the current cell or from neighbouring cells, and using said information to establish a communication link in order for the mobile communication device to receive at least one service.

The present invention is to provide the advantage of reducing the signalling overhead of the network by avoiding the duplication of information associated with the radio bearer common configuration, whether that information is the common configuration information or references to the common configuration information.

The present invention is further to provide the advantage of reducing the duplication of reference information that is associated with common configuration information, and so provides a reduction in the signalling overhead.

BRIEF DESCRIPTION OF THE DRAWINGS

Exemplary embodiments of the present invention will now be described by way of example only, with reference to the accompanying drawings in which.

Throughout the drawings, like reference numerals will be understood to refer to like parts, components and structures.

DETAILED DESCRIPTION OF EXEMPLARY EMBODIMENTS

Figure 3:
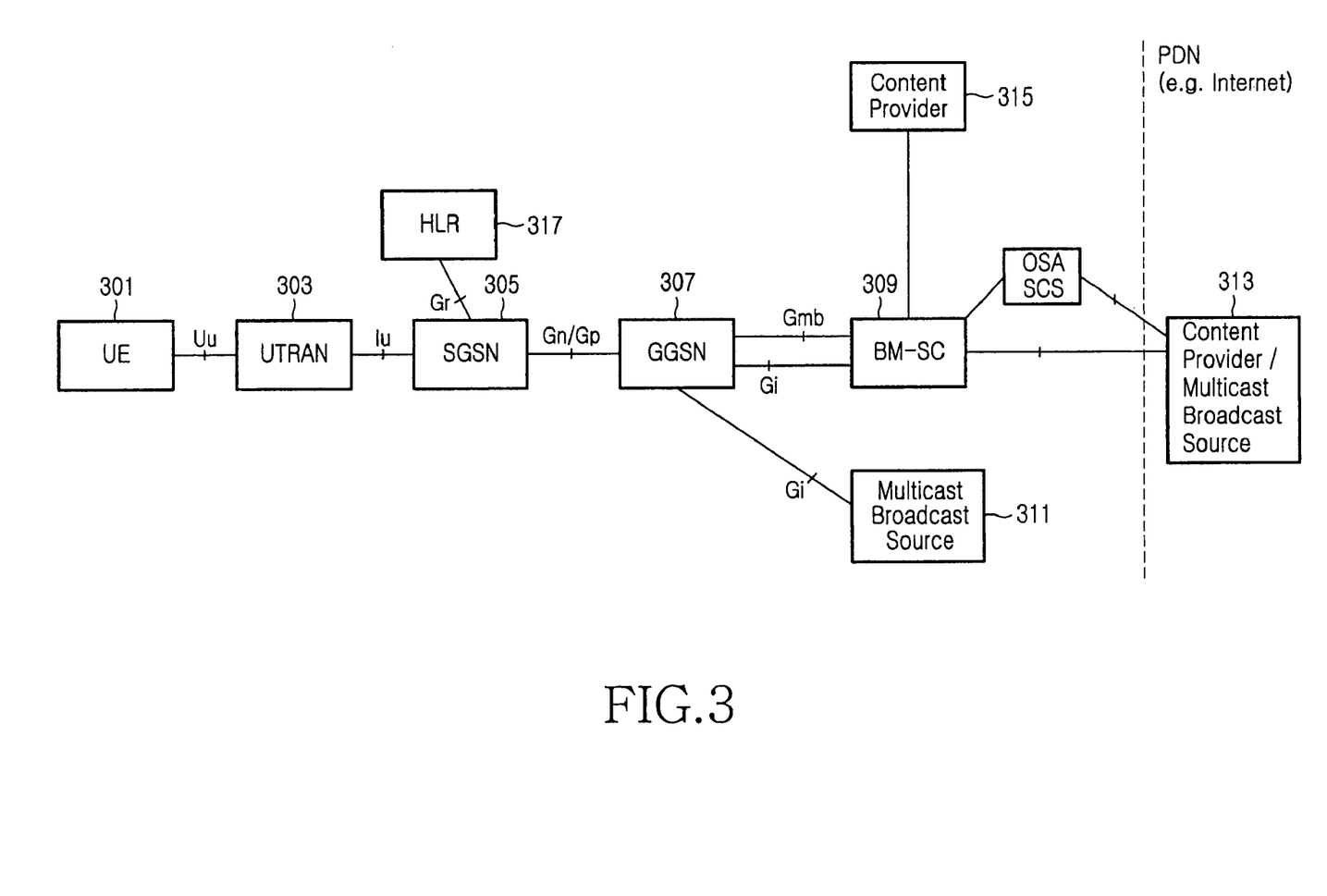
FIG. 3 is a diagram illustrating a layout of a multimedia broadcast multicast services (MBMS) UMTS for use with the method according to an exemplary embodiment of the present invention.

FIG. 3 is a diagram illustrating a layout of multimedia broadcast multicast services (MBMS) Universal Mobile Telecommunications System (UMTS) architecture, which is suitable for utilizing the method according to an exemplary embodiment of the present invention.

User equipment (UE) 301 is connected to the UTRAN 303 via the radio interface (Uu). The Universal Terrestrial Radio Access Network (UTRAN) 303 is connected to the serving General Packet Radio Service (GPRS) support node (SGSN) 305 via the Iu interface. Connected to the SGSN is the home location register (HLR) 317 via the Gr interface. Also connected to the SGSN 305 is the Gateway GPRS Support Node (GGSN) 307 via the Gn/Gp interfaces. A broadcast multicast service centre (BM-SC) 309 is connected to the GGSN 307 via a Gmb interface and Gi interface. Multicast broadcast sources 311 and 313 are also provided within the network. Finally, a content provider 315 is connected to the BM-SC 309.

When the UE 301 enters a cell, it checks to see if data is provided for one or mores of its active services. That is, any MBMS multi-cast services the UE is subscribed to receive, or any broadcast services the UE has been enabled (for example, by the network) to receive. Also, at the start of a new data transfer session for one of the services, known as "session start", the UE 301 is informed of this new session.

At the start of a new data transfer session for a particular service (session start), the UE is informed, or notified, by the UTRAN. Before the UTRAN 303 provides any data to the UE, it is optional for the UTRAN to count the number of UEs in the cell in order to decide whether the data transfer should be carried out in point-to-point mode or point-to-multipoint mode.

If point-to-multipoint mode is selected, the details of the radio bearer configuration for all MBMS services available in the current and/or neighbouring cells are signalled to the UE 301 over the radio interface Uu on the MCCH. The UE 301 is then able to use the radio bearer configuration information provided to setup a data transmission channel with the radio bearers and so receive the data corresponding with the MBMS service.

The radio bearer configuration, also referred to as the entire radio configuration, comprises the "real" RB configuration, the transport channel configuration (TrCh) and the physical channel configuration (PhyCh).

In an exemplary implementation of the present invention, the "common RB info" message of the conventional system is not used. A "MBMS common PTM RB information" message is used as an alternative, and works in a similar way to the previously described "common RB info" message.

The "service RB info" message, as used in conventional systems, is not used. Instead, new messages are used to provide the UE with radio bearer configuration information allowing the UE to receive all the MBMS services that are available to it. The MBMS services may be received either from a base station located in the UEs current cell, or from a base station located in a neighbouring cell. A first message type is specific to the current cell and provides RB configuration information for all services available from radio bearers located in that current cell. A second message type provides radio bearer configuration information for all services available from radio bearers located in neighbouring cells. Examples of each of these messages are described in more detail below.

MBMS Common PTM RB Information Message

This message is transmitted periodically by UTRAN to inform UEs about the PTM RB configuration information that may be common between different services, applicable in the current and/or in neighbouring cells. The message content does not change within a modification period.
Logical channel: MCCH
Direction: UTRAN→UE

| Information Element/Group name | Need | Multi | Type and reference | Semantics description | Version |
|---|---|---|---|---|---|
| Message type | MP | | Message Type | | REL-6 |
| RB information list | MP | 1 to <maxMBMS-CommonRB> | | | REL-6 |
| >RB identity | MP | | MBMS Common RB identity 10.3.9a.3 | | REL-6 |
| >PDCP info | MP | | PDCP info 10.3.4.2 | | REL-6 |
| >RLC info | MP | | RLC info MBMS 10.3.4.23a | | REL-6 |
| TrCh information for each TrCh | MP | 1 to <maxMBMS-CommonTrCH> | | | REL-6 |
| >Transport channel identity | MP | | MBMS Common TrCh identity 10.3.9a.4 | | REL-6 |
| >TFS | MP | | Transport format set 10.3.5.23 | | REL-6 |
| TrCh information for each CCTrCh | MP | 1 to <maxMBMS-CommonCCTrCh> | | | REL-6 |
| >CCTrCH identity | MP | | MBMS Common CCTrCh identity 10.3.9a.1 | | REL-6 |
| >TFCS | MD | | Transport format combination set 10.3.5.20 | The default value of the TFCS is specified in subclause 14.10.1 | REL-6 |
| PhyCh information | MP | 1 to <maxMBMS-CommonPhyCh> | | | REL-6 |
| >PhyCh identity | MP | | MBMS Common PhyCh identity 10.3.9a.2 | | REL-6 |

-continued

| Information Element/Group name | Need | Multi | Type and reference | Semantics description | Version |
|---|---|---|---|---|---|
| >Secondary CCPCH info MBMS | MP | | Secondary CCPCH info MBMS 10.3.6.71a | | REL-6 |

MBMS Current Cell PTM RB Information Message

This message is transmitted periodically by UTRAN to inform UEs about the PTM RB configuration used in a cell, in the case where one or more MBMS service is provided using PTM radio bearers. The message content does not change within a modification period.

Logical channel: MCCH

Direction: UTRAN→UE

| Information Element/Group name | Need | Multi | Type and reference | Semantics description | Version |
|---|---|---|---|---|---|
| Message type | MP | | Message Type | Current cell PTM RB info | REL-6 |
| S-CCPCH list | OP | 1 to <maxSCCPCH> | | Absent in case MTCH are only mapped to the S-CCPCH(s) included in SIB type 5 | REL-6 |
| >S-CCPCH identity | OP | | MBMS Current cell S-CCPCH identity 10.3.9a.5 | When L1-combining applies, this identity is used to refer to this S-CCPCH within the NEIGHBOURING CELL PTM RB INFORMATION message | REL-6 |
| >Secondary CCPCH info | MP | | MBMS Common PhyCh identity 10.3.9a.2 | Refers to a configuration in the common RB info | REL-6 |
| >MBMS Soft Combining Timing Offset | CV-Soft-FDD | | MBMS Soft Combining Timing Offset 10.3.9a.10a | Timing offset applied in the CFN calculation in sub-clause 8.5.15.5. The default value is 0 ms. | REL-6 |
| >TrCh information common for all TrCh | MP | | MBMS Common CCTrCh identity 10.3.9a.1 | Refers to a (TFCS) configuration in the common RB info | REL-6 |
| >TrCH information list | MP | 1 to <maxTrChperSCCPCH> | | List of FACH transport channels carrying one or more MTCH | REL-6 |
| >>TrCh information | MP | | MBMS Common TrCh identity 10.3.9a.4 | Refers to a (TFS) configuration in the common RB info | REL-6 |

-continued

| Information Element/Group name | Need | Multi | Type and reference | Semantics description | Version |
|---|---|---|---|---|---|
| >>RB information list | OP | 1 to <maxRBperTrCh> | | The IE is absent if temporarily no RBs are mapped to this TrCh or if the TrCH only carries MSCH | REL-6 |
| >>>RB information | MP | | MBMS PTM RB information 10.3.9a.7a | | REL-6 |
| >>MSCH configuration information | OP | | MSCH configuration information 10.3.9a.16 | | REL-6 |
| S-CCPCH in SIB type 5 | OP | 1 to <maxSCCPCH> | | Every S-CCPCH's included in SIB type 5 may carry MTCH | REL-6 |
| >S-CCPCH identity | | | Integer (1 ... maxSCCPCH) | Index of the S-CCPCH within the list included in SIB type 5 | REL-6 |
| >TrCH information list | MP | 1 to <maxFACHPCH> | | List of FACH transport channels carrying one or more MTCH | REL-6 |
| >>TrCh identity | MP | | Integer (1 ... maxFACHPCH) | Index of the FACH within the list of TrChs defined for that S-CCPCH as included in SIB type 5 | REL-6 |
| >>RB information list | OP | 1 to <maxRBperTrCh> | | The IE is absent if this TrCh only carries MSCH | REL-6 |
| >>>RB information | MP | | MBMS PTM RB information 10.3.9a.7a | | REL-6 |
| >>MSCH configuration information | OP | | MSCH configuration information 10.3.9a.16 | Included if the TrCH carries MSCH | REL-6 |

| Condition | Explanation |
|---|---|
| Soft-FDD | This IE is used only for FDD. It is mandatory default for FDD if the IE "L1 combining" is included in MBMS NEIGHBOURING CELL PTM RB INFORMATION. Otherwise it is not needed. |

MBMS Neighbouring Cell PTM RB Information Message

This message type is transmitted periodically by UTRAN to inform UEs about the PTM RB configuration used in neighbouring cells, indicating the UE may perform selection and/or soft combining of MBMS services. The message content does not change within a modification period.

Logical channel: MCCH

Direction: UTRAN→UE

| Information Element/Group name | Need | Multi | Type and reference | Semantics description | Version |
|---|---|---|---|---|---|
| Message type | MP | | Message Type | | REL-6 |

| Information Element/Group name | Need | Multi | Type and reference | Semantics description | Version |
|---|---|---|---|---|---|
| Neighbouring cell identity | MP | | Integer (0 ... <maxCell Meas – 1>) | Points to IE 'Cell Info' obtained from IE 'Intra-frequency Cell Info list' in SIB 11. | REL-6 |
| Neighbouring cell's S-CCPCH list | MP | 1 to <maxSCCPCH> | | | REL-6 |
| >Secondary CCPCH info | MP | | MBMS Common PhyCh identity 10.3.9a.2 | S-CCPCH configuration used in neighbouring cell. Refers to a configuration in the common RB info | REL-6 |
| >Secondary CCPCH Power Offset Difference | MD | | Integer (–6, –3, 3, 6) | Difference (Pn – Of) between the S-CCPCH power offset (Pn) of the neighboring cell S-CCPCH and an arbitrary offset (Of). An arbitrary offset (Of) is specific to the current cell and the same for all its neighbouring cells, in dB. Default value is 0. Note 3 and 4. | REL-6 |
| >>L1 combining | OP | | | L2-combining applies if the IE is absent | REL-6 |
| >>CHOICE mode | MP | | | | REL-6 |
| >>>FDD | | | | | REL-6 |
| >>>>MBMS Soft Combining Timing Offset | MP | | MBMS Soft Combining Timing Offset 10.3.9a.10a | Timing offset applied in the CFN calculation in subclause 8.5.15.5 | REL-6 |
| >>>>MBMS transmission time difference | MP | | Integer (0 ... 3) | Indicates the time difference between the TTIs on the current and the neighbouring cell's SCCPCH that can be L1-combined | REL-6 |
| >>>>MBMS L1 combining schedule | OP | | MBMS L1 combining schedule 10.3.9a.7 | If included partial layer 1 combining applies, in which case this IE indicates when L1-combining applies. If the IE is absent, L1 combining applies continuously | REL-6 |
| >>>TDD | | | | (no data) | REL-6 |
| >CHOICE L23 | MP | | | | REL-6 |

-continued

| Information Element/Group name | Need | Multi | Type and reference | Semantics description | Version |
|---|---|---|---|---|---|
| configuration | | | | | |
| >>SameAs Current cell | | | | Apart from the physical channel configuration and the MSCH configuration information, the same configuration as for the indicated S-CCPCH used in the current cell applies | REL-6 |
| >>>Current cell's S-CCPCH | MP | | MBMS Current cell S-CCPCH identity 10.3.9a.5 | Reference to the S-CCPCH in the current cell with which applies exactly the same configuration | REL-6 |
| >>>MSCH configuration information | MP | | MSCH configuration information 10.3.9a.16 | | REL-6 |
| >>Different | | | | | REL-6 |
| >>>TrCh information for common for all TrCh | MP | | MBMS Common CCTrCh identity 10.3.9a.1 | Refers to a (TFCS) configuration in the common RB info | REL-6 |
| >>>TrCH information | MP | 1 to <maxFACHPCH> | | | REL-6 |
| >>>>TrCh information | MP | | MBMS Common TrCh identity 10.3.9a.4 | Refers to a (TFS) configuration in the common RB info | REL-6 |
| >>>>TrCh combining status | MP | | BOOLEAN | Value TRUE means that TrCh combining is used for this transport channel (TDD only). Note 2. | REL-6 |
| >>>>RB information list | OP | 1 to <maxRBperTrCh> | | The IE is only present for the radio bearers for which selection (FDD) or transport channel (TDD) combining applies. | REL-6 |
| >>>>>RB information | MP | | MBMS PTM RB information 10.3.9a.7a | | REL-6 |
| >>>>MSCH configuration information | OP | | MSCH configuration information 10.3.9a.16 | Included if the TrCH carries MSCH | REL-6 |

It should be noted that:

The signalling supports the option that UTRAN maps one service to L1 combining slots for some neighbours and to the L2 combining slots for other neighbours, i.e. the use of different combining schemes for different neighbours.

Transport combining can only be indicated when the complete L2 configuration is provided for the neighbouring cell (in other words, using L2 configuration choice "different"). Fortunately, a scenario in which the neighbouring cell configuration is different from the current cell is regarded as the typical scenario for using transport combining.

For FDD, an S-CCPCH power offset is defined as the offset between one S-CCPCH and the P-CPICH of a given cell (Ps-ccpch-Pp-cpich). For TDD, an S-CCPCH power offset is defined as the offset between one S-CCPCH and the P-CCPCH of a given cell (Ps-ccpch-Pp-ccpch).

The Secondary CCPCH Power Offset Difference IE gives the UE an indication of the S-CCPCH power on the neighbouring cells that may be used to complete the neighbouring cell ranking based on P-CPICH power for FDD or P-CCPCH for TDD.

The "MBMS common PTM RB information" message provides the UE with PTM RB configuration information that is common to different services that may be provided by PTM radio bearers in the current cell and/or in a neighbouring cell.

The MBMS cell PTM RB information message groups the references to the common configuration information stored in the MBMS common PTM RB information message per cell, rather than per service as in the prior art.

In a given cell such as cell A, there is one type of MBMS cell PTM RB information message containing RB configuration information for all PTM MBMS services available from radio bearers provided within that cell. This MBMS "current cell" PTM RB information message is transmitted to all UEs within the cell in which the radio bearer is provided.

Furthermore, in the given cell A there is another type of MBMS cell PTM RB information message transmitted, one for each relevant neighbouring cell, thus providing the corresponding RB configuration information applicable for that cell. This neighbouring cell information is signalled in the current cell so that the UE only needs to acquire the MBMS control information from one cell, referred to as the current cell i.e. the cell the UE has selected to acquire the MBMS control information from.

For an example, for a current cell with six relevant neighbouring cells, there will be seven MBMS cell PTM RB information messages, one for the current cell and six for the neighbouring cells. Likewise, neighbouring cells of cell A may provide RB configuration information for the current cell, cell A. This enables a UE to receive MBMS data for a particular service provided by radio bearers in the current cell and/or a neighbouring cell.

The MBMS "neighbouring cell" PTM RB information message is transmitted to all UEs within the cell. This message provides radio bearer configuration information required for a UE to receive all MBMS services available from within the current cell that are also provided by radio bearers from a neighbouring cell. That is, a UE located in cell A may receive any number of MBMS services provided by radio bearers in cell A. In addition, the UE can receive these same services provided by radio bearers in neighbouring cells. The RB configuration information in the 'neighbouring cell' message provides details of the radio bearer configuration required for the UE to receive these same services provided by radio bearers in neighbouring cells.

As the 'current cell' and 'neighbouring cell' RB configuration information messages are cell specific, and provide RB configuration information for all services available to the UE from its current location, the number of references in the messages to common configuration information is reduced. This reduction is depicted in Table No. 2 below.

TABLE 2

| Cell RB Info - for 'current cell' message | | | |
|---|---|---|---|
| Phy-Ch common config | TrCh- common config | RB common config | Service |
| 1 | 1 | 1 | 1 |
|   |   | 1 | 2 |
|   | 2 | 1 | 3 |
|   |   | 1 | 4 |
|   | 3 | 2 | 5 |

This example shows that when the RB information is specified 'per cell', for each cell the PhyCh configuration is referenced only once rather than once per service. Likewise, the number of references for the TrCh configuration is reduced.

Although table 2 above shows 3 different configurations for the transport channel, it may be the case that the transport channel configurations are the same for all services. In which case, there would only be a single reference to the transport configuration in the RB information messages.

As each reference to the common configuration information stored within the MBMS common PTM RB information message uses up a number of bits within the signalling on the MCCH, grouping the radio bearer configuration information messages per cell reduces the signalling overhead on the MCCH.

The signalling overhead is reduced even further when compared to conventional systems where the actual details of the radio bearer configuration are included in the RB configuration information messages rather than just the references to common configurations.

In addition, not only does the UE receive messages containing RB configuration information associated with all services provided by radio bearer's in the current cell, the UE also receives messages containing RB configuration information associated with these services for radio bearers in neighbouring cells. Therefore, further signalling overhead gains are made on these messages.

When a mobile communication device receives the MBMS cell PTM RB configuration information messages, it uses the radio bearer configuration information contained therein to set up a PTM communication link. If the radio bearer configuration information within the MBMS "current cell" PTM RB information message (or "neighbouring cell" RB information message) merely refers to MBMS common PTM RB information, the information in the MBMS common PTM RB information message is used to set up a PTM communication link. The PTM communication link allows information provided in an MBMS service to be sent to, and received by, the user equipment.

Furthermore, if any radio bearer information within the newly defined MBMS Cell PTM RB configuration information messages has changed, the associated message is scheduled by UTRAN to be transmitted at the beginning of a repetition period over the MCCH. Any MBMS Cell PTM RB configuration information messages that only contain unchanged RB information are transmitted towards the end of the repetition period. Also, the UTRAN provides scheduling information indicating the final TTI containing the change information, so the UE is aware of the end point of all messages that contain changed information. Therefore, UEs only need to read the beginning part of the MCCH information being provided during the repetition period in order to pick up any radio bearer information that has changed. This approach reduces the time the UE needs to read MCCH after having been notified that a change has occurred for one of its active services.

During the transmission of radio bearer information on the MCCH, the present invention groups the radio bearer information according to each cell rather than according to each service thus providing a reduction in the number of references to common RB configuration information and so reducing the signalling overhead on the MCCH.

Changed information is scheduled at the beginning of a repetition period on the MCCH, which reduces the UE battery consumption in certain scenarios.

It will be understood that the embodiment of the present invention described herein is by way of example only, and that various changes and modifications may be made without departing from the scope of the invention. For example, although the invention is described with reference to the UMTS radio interface, it is also applicable to other similar systems where it is required to transmit radio bearer configuration information to user equipment.

Also, it will be understood that, although the above embodiment provides RB configuration information "per cell" rather than "per service", that a combination of "per cell" and "per service" messages can be utilised in the system. That is, a predetermined parameter can be used to decide whether it is more efficient to use the "per cell" or "per service" message. One example is to calculate the signalling overhead of the "per cell" method, and if the signalling overhead exceeds a threshold, a switch is made to use the "per cell" message. In a further example, the UTRAN may switch from a "per cell" method to a "per service" method if the number of services available in a particular cell is reduced, and so it becomes more efficient to send the configuration information in this manner. In this particular embodiment the user equipment is able to use either of the 'per cell' type or 'per service' type messages in order to set up a PTM communication link to receive the service.

Further, it will be understood that the current cell and neighbouring cell RB PTM configuration data could be included in a single message transmitted by the radio bearer in each cell, rather than separately in a 'current cell' type message and a 'neighbouring cell' type message. That is, the configuration data set is grouped into a single set of data and transmitted in a single message.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. In a cellular communication network comprising a plurality of cells and one or more multimedia broadcast multicast service (MBMS) providers arranged to provide a plurality of multicast/broadcast services over a radio interface to a mobile communication device located in a current cell, a method of providing radio bearer configuration information to enable the mobile communication device to receive a multicast/broadcast service, the method comprising the steps of:

providing to a mobile communication device messages containing information associated with the radio bearer configuration, wherein each message is associated with a plurality of multicast/broadcast services that are available to be transmitted to the mobile communication device when in the current cell, and periodically transmitting the messages to the mobile communication device within the current cell, wherein the messages comprise a first message, a second message and a third message, said first message being associated with the plurality of multicast/broadcast services that are available to be transmitted to the mobile communication device from the current cell, said second message being associated with the plurality of multicast/broadcast services that are available to be transmitted to the mobile communication device from a neighbouring cell, and said third message being associated with the plurality of multicast/broadcast services that are available to be transmitted to the mobile communication device from the current cell and from the neighbouring cell.

2. The method of claim 1, wherein the first message comprises MBMS soft combining timing offset information element (IE).

3. The method of claim 1, wherein the second message comprises Layer 1 combining information element (IE) indicating that Layer 2 combining applies.

4. The method of claim 1, wherein there is a single second message for each neighbouring cell.

5. The method according to claim 1, further comprising the steps of:

determining whether a parameter value associated with the current cell is below a predetermined limit, and upon a positive determination, ceasing to provide the messages associated with the plurality of multicast/broadcast services, and providing a fourth message associated with one particular service that is available to be transmitted to the mobile communication device when located in the current cell, and, within the fourth message, providing information associated with the radio bearer configuration required for the mobile communication device to receive that particular service and no other from the current cell or one or more neighbouring cells, and periodically transmitting the fourth message within the current cell.

6. The method according to claim 5, further comprising the steps of:

determining whether the parameter value is above a predetermined limit, and upon a positive determination, ceasing to provide the fourth message, and providing messages associated with the plurality of multicast/broadcast services that are available to be transmitted to the mobile communication device when in the current cell, and, periodically transmitting the messages within the current cell.

7. The method according to claim 1, wherein the information associated with the radio bearer configuration comprises the radio bearer configuration information.

8. The method according to claim 7, wherein the radio bearer configuration information is information associated with the real radio bearer configuration, the transport channel configuration and the physical channel configuration.

9. The method according to claim 1, wherein the information associated with the radio bearer configuration comprises a reference to the radio bearer configuration information.

10. The method according to claim 9, wherein the radio bearer configuration information is information associated with the real radio bearer configuration, the transport channel configuration and the physical channel configuration.

11. The method according to claim 1, wherein the messages are sent at the beginning of a repetition period if the radio bearer configuration has changed since the last modification period.

12. The method according to claim 1, wherein at least one of the messages comprises a single reference to any common configuration of physical channels required for the mobile communication device to receive the service.

13. The method according to claim 1, wherein at least one of the messages comprises a single reference to any common configuration of transport channels required for the mobile communication device to receive the service.

14. In a cellular communication network comprising a plurality of cells, and further comprising one or more service providers arranged to provide services over a radio interface to a current cell, a method of receiving information to enable a mobile communication device to receive at least one service, the method comprises the steps of:

receiving messages associated with the radio bearer configuration of radio bearers adapted to transmit at least one of the services to the mobile communication device in the current cell, wherein each message is associated with a plurality of services that are available to be received by the mobile communication device from the current cell or from neighbouring cells, and using said information to set up a communication link in order for the mobile communication device to receive at least one service, wherein the messages comprise a first message, a second message and a third message, said first message being associated with the plurality of multicast/broadcast services that are available to be transmitted to the mobile communication device from the current cell, said second message being associated with the plurality of multicast/broadcast services that are available to be transmitted to the mobile communication device from a neighbouring cell, and said third message being associated with the plurality of multicast/broadcast services that are available to be transmitted to the mobile communication device from the current cell and from the neighbouring cell.

15. A terrestrial mode cellular system arranged to carry out the method according to any preceding claim.

16. A radio network controller arranged to send messages by the method according to any of claims 1 through 4, 5 through 13, and 14.

17. A mobile communication device specifically adapted to receive messages as sent by the method according to any of claims 1 through 4, 5 through 13 and 14.

* * * * *